United States Patent
Mullins et al.

(10) Patent No.: US 7,871,483 B2
(45) Date of Patent: Jan. 18, 2011

(54) BOND ENHANCEMENT FOR UNDERWATER REPAIR

(75) Inventors: Gray Mullins, Tampa, FL (US); Rajan Sen, Tampa, FL (US)

(73) Assignee: University of South Florida, Tampa, FL (US)

(*) Notice: Subject to any disclaimer, the term of this patent is extended or adjusted under 35 U.S.C. 154(b) by 1007 days.

(21) Appl. No.: 11/580,153

(22) Filed: Oct. 12, 2006

(65) Prior Publication Data

US 2007/0079929 A1    Apr. 12, 2007

Related U.S. Application Data

(60) Provisional application No. 60/726,355, filed on Oct. 12, 2005.

(51) Int. Cl.
*B32B 37/00*    (2006.01)

(52) U.S. Cl. .................... 156/94; 156/184; 156/285

(58) Field of Classification Search .................. 156/184, 156/285, 94
See application file for complete search history.

(56) References Cited

U.S. PATENT DOCUMENTS

| | | | |
|---|---|---|---|
| 5,505,030 A * | 4/1996 | Michalcewiz et al. | 52/249 |
| 5,656,231 A * | 8/1997 | Blackmore | 264/408 |
| 6,251,034 B1 * | 6/2001 | Eggiman et al. | 473/567 |
| 6,363,681 B1 * | 4/2002 | Neuner | 52/834 |

FOREIGN PATENT DOCUMENTS

KR    2004-0034650 A  *  4/2004

OTHER PUBLICATIONS

Taljsten, et al, "Strengthening concrete beams for shear using CFRP-materials:evaluation of different application methods" Composites Part B 31 (2000), pp. 87-96.*
Sen, Rajan, "Advances in the application of FRP for repairing corrosion damage", Prog. Structuct. Engng. Mater., 2003, pp. 99-113.*
IDEA proposal, Aug. 25, 2006.

* cited by examiner

*Primary Examiner*—Jeff H Aftergut
(74) *Attorney, Agent, or Firm*—Saliwanchik, Lloyd & Saliwanchik

(57) ABSTRACT

Provided is a method for enhancing an adhesive bond between a pile and a resin adhesive by maintaining a constant uniform positive pressure of the entire wrapped region regardless of the shrinkage in the resin adhesive. This invention enhances underwater adhesive bond by ensuring proper contact while curing. In one embodiment, constant inward pressure is created by encapsulating the repair and applying a vacuum. The invention can be used for a variety of underwater applications using different resins and different substrate materials. For instance, the invention could be used to repair damaged critical infrastructure, e.g. Bridges, dams, pipelines and locks. Local, state and federal agencies in US and elsewhere as well as marine and naval contractors would find great utility with the invention. The concept could be extended to all adhesion dependent repairs.

10 Claims, 2 Drawing Sheets

BOND ENHANCEMENT FOR UNDERWATER REPAIR

CROSS-REFERENCE TO RELATED APPLICATION(S)

The present application claims the benefit of U.S. Provisional Application Ser. No. 60/726,355, filed Oct. 12, 2005, which is incorporated herein by reference in its entirety, including any figures, tables, or drawings.

FIELD OF THE INVENTION

This invention relates to bond enhancements of underwater repairs via vacuum or pressure bagging.

BACKGROUND OF INVENTION

Underwater repairs using resin-impregnated, fiber-reinforced polymers (FRP) are plagued with poor performance due to entrapped water and poor contact pressure during the curing. This invention will overcome the defective bond performance while increasing reliability and efficiency, and decreasing the cost of satisfactory repairs.

Current methods for installing fiber reinforced polymers underwater rely on the pressure exerted by a plastic shrink film that is wound tightly round the repair. Recent tests showed that the bond achieved between the FRP and the substrate using this method could be exceedingly poor. This is in part because the resin shrinks as it cures and the original pressure reduces over time. Further, trapped water between the repair material and the pile along with the wave action of the open water marine environment contributed to the unsatisfactory bond.

BRIEF SUMMARY

This invention is intended to solve the aforementioned shortcomings by maintaining a constant uniform positive pressure over the entire wrapped region regardless of the shrinkage in the resin adhesive. This invention enhances underwater adhesive bond by ensuring proper contact while curing. Constant inward pressure is key, and can be created by encapsulating the repair and applying a vacuum. Alternatively, pressure bagging can be applied, or a combination of vacuum and pressure bagging. The invention can be used for a variety of underwater applications using different resins and different substrate materials. For instance, the invention could be used to repair damaged critical infrastructure, e.g. Bridges, dams, pipelines and locks. Local, state and federal agencies in US and elsewhere as well as marine and naval contractors would find great utility with the invention. The concept could be extended to all adhesion dependent repairs.

DETAILED DISCLOSURE

Good bond requires penetration of the resin material through the pores in the substrate. In field applications, a thin plastic shrink film is tightly wound around the FRP material to keep it in position as it cured and also to provide protection from the elements. However, measured bond stress suggests that this was not effective and the resin was unable to penetrate through the water-filled pores in all cases. This problem may be remedied if positive pressure is applied to the wrap that can force the resin to penetrate the concrete pores. In one embodiment, this can be achieved using "vacuum bagging". In another embodiment, this can be achieved using pressure bagging. In yet another embodiment, a combination of vacuum and pressure bagging can be used to apply positive pressure to the wrap.

Vacuum bagging is a well established technique for applying FRP and is mostly used for commercial uses involving new fabrication. As the name implies, vacuum bagging requires the creation of a vacuum. An embodiment of the subject invention extends vacuum bagging techniques to repair elements both above and underwater. In addition, the subject invention can improve the bond of resin materials in a substrate. In an embodiment, the creation of a vacuum can occur inside the former "shrink film" or its equivalent, now referred to as a "vacuum bag" that encapsulates the wrap. This vacuum subjects the entire wrapped area to the same positive pressure that is sustained during curing and will force the resin to penetrate through the concrete pores and also expel any trapped air, water or excess resin.

The essential components of the vacuum bagging system are (1) a vacuum bag and (2) a vacuum pump capable of creating a significant vacuum and (3) tubing. In addition there needs to be means for soaking up expelled resin and its subsequent removal after the FRP has cured without it sticking to the FRP and marring its appearance.

Figure 1B:
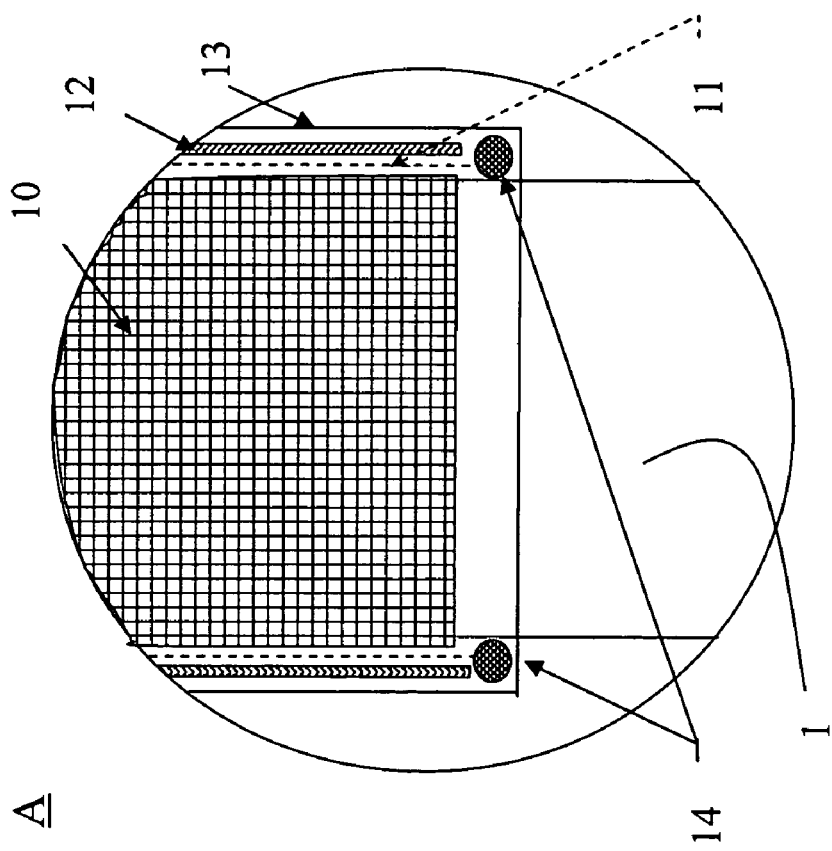
FIGS. 1A and 1B show a schematic of a vacuum bagging system according to an embodiment of the present invention.
Figure 1A:
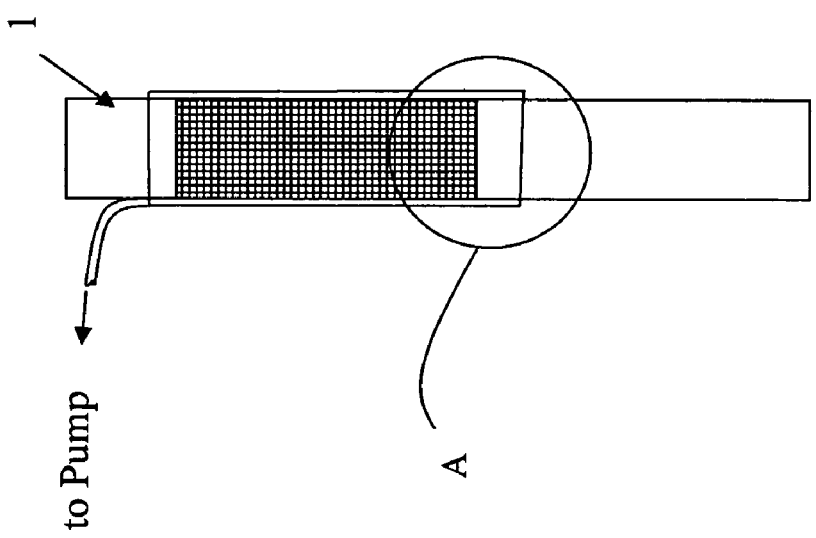

A schematic of the proposed bagging system is shown in FIGS. 1A and 1B. In this figure, a porous thin film which will not stick to the resin is referred to as "release" and a thicker layer of absorbent material, called a "breather". The breather also allows air to be extracted from inside the bag. The bag is sealed at its ends so that a vacuum can develop. It is envisaged that a one atmosphere vacuum pressure will be created.

Referring to FIG. 1A, a vacuum bagged FRP-repaired pile is shown. FIG. 1B provides a detail view of region 'A'. A pile 1 can be wrapped with a FRP mesh 10 that has been impregnated with a resin. A release film 11 and a breather layer 12 can be applied. Then the wrap can be encased in a vacuum bag 13. The vacuum bag 13 can be sealed using, for example, a sealant strip 14. Then, a vacuum pump can be used to remove air from within the vacuum bag 13 until vacuum pressure is created to provide a positive pressure against the FRP mesh 10.

Figure 2:
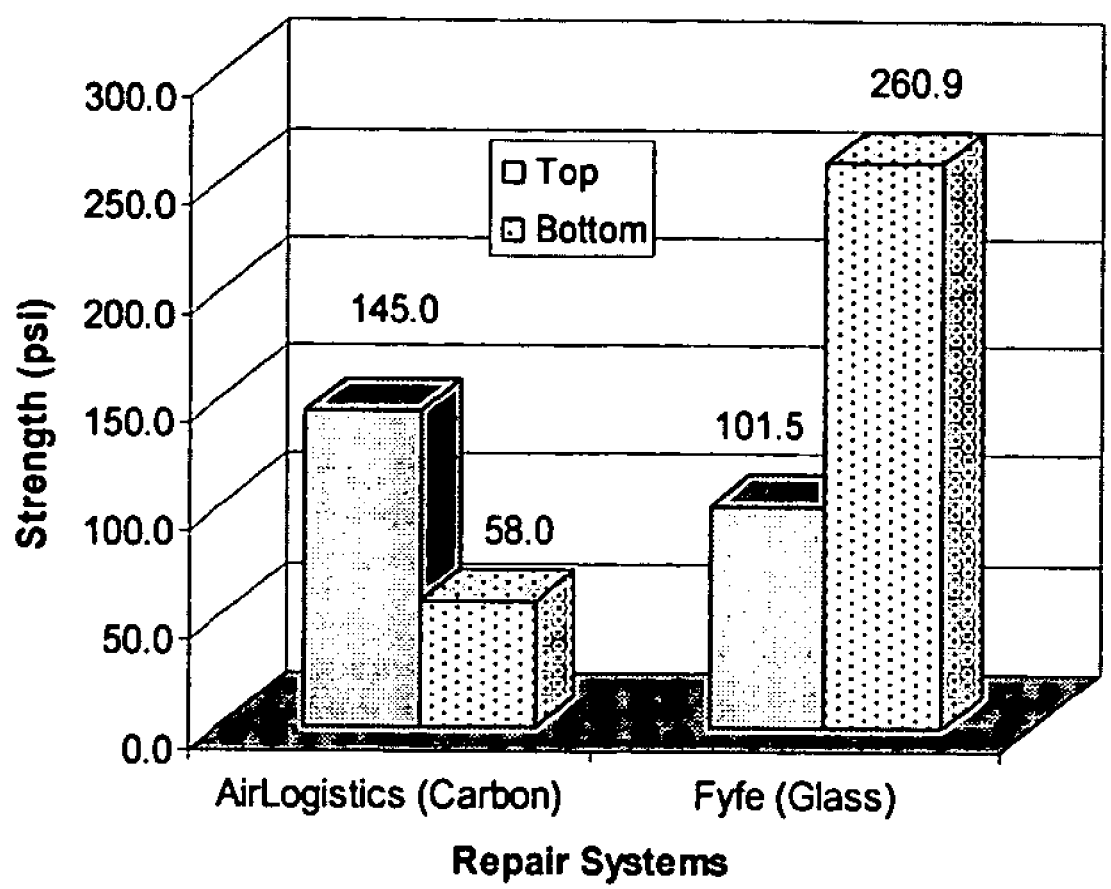
FIG. 2 shows a graphical representation of measured residual bond from a test for two underwater repair systems not incorporating the subject invention.

FIG. 2 shows the variation in the residual bond obtained from pullout tests (for piles wrapped on the Gandy Bridge, Tampa Bay) for two different prior art underwater repair systems taken that the 'top' of the wrap (the part of the pile that is always dry) and at the bottom (where it is subjected to wetting and drying due to tide change). There is considerable variability in the bond over the depth of the wrap even though the same technique was used for both systems.

Inspection of FIG. 2 shows that the prior art system that works better under water (Fyfe: 260.9 psi) performs more poorly in the dry region (101.5 psi) and vice versa for the other brand (Air Logistics: 145 psi and 58 psi at the corresponding regions). Since surface preparation was similar for both systems, the large variation was most likely because of non-uniform pressure over the length of the wrap as the resin cured.

Accordingly, there is a need for a technique that can assure uniform pressure over the length of the wrap as the resin cured.

Typically, resin is initially a liquid with zero shear strength. In applications where the FRP is placed around vertical members, external pressure from a tight-fitting plastic shrink wrap provides the necessary frictional resistance to prevent the saturated FRP from sliding. Because of buoyancy effects, this pressure is not constant over the length of the wrap. A robust system that can maintain constant pressure on the wrap as it cures can solve the problem of variable bond as shown in FIG. 2.

Described below are two examples of means for maintaining contact pressure according to the subject invention. These are (1) pressure bagging and (2) vacuum bagging. It is possible that the optimal solution for maintaining contact pressure will be a combination of both pressure and vacuum bagging.

Pressure bagging makes use of a pressure bladder that surrounds the pile or column similar to a blood pressure cuff. Vacuum bagging extends available technology to underwater applications whereby up to 1 atmosphere (14.7 psi or 1 tsf) can be easily applied to the wrap/concrete interface.

Pressure Bagging

Pressure bagging FRP repairs on piling or columns can be relatively simple in concept and in application. Therein the shape of the repaired pile section allows the pressure bag to develop restraint from its tensile capacity unlike a flat surface repair where an external reaction system would be required. The pressure bag incorporates an air-tight bladder (low tensile strength) contained within a restraining structure which can be either rigid or flexible. In a preferred embodiment, flexible restraints can be used as they can be fitted and adapted as necessary to accommodate multiple pile sizes. The restraining pressure to assure proper contact is limited to the hoop strength of the pressure bag.

Vacuum Bagging

Vacuum Bagging FRP on concrete has been used very little but was shown to be effective in dry conditions. In Vacuum bagging, external pressure is applied to a sealing layer by evacuating entrapped air within the wrap using a system consisting of a sealing bag, breathing material and a vacuum pump. It is particularly advantageous for large flat surfaces where hoop strength is difficult to develop or where adjacent structures are not available to provide a reaction force for a pressure bag. No special strength considerations arise concerning the bag tensile strength but rather a puncture resistant membrane material is sought.

In a specific embodiment, to assure proper contact, a 5 to 10 psi net pressure has been shown to be effective in consolidate the fibers and resin while maintaining intimate contact with the concrete substrate. Net pressure can be controlled with vacuum regulators to a specified value up to 14.7 psi (1 atm).

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A method of bond enhancement for underwater applications comprising:
    wrapping an underwater portion of a pile with fiber reinforced polymers (FRP) having a resin for penetrating pores of the pile;
    applying substantially constant, uniform, positive pressure to the FRP wrap to force the resin to penetrate the pores of the pile; and
    maintaining the positive pressure to the FRP wrap during ambient curing of the resin, whereby underwater bonding of the FRP wrap is enhanced.

2. The method according to claim 1, wherein applying positive pressure to the FRP wrap comprises:
    coating the FRP wrap with a release formed of a porous thin film that does not stick to the resin and a breather formed of a thicker layer of absorbent material that allows air to be extracted from inside a vacuum bag;
    securing the vacuum bag around the FRP wrap, release, and breather; and
    creating a vacuum by pumping out air from inside the vacuum bag.

3. The method according to claim 1, wherein the positive pressure applied is up to 14.7 psi.

4. The method according to claim 1, wherein the positive pressure applied is between 5 psi to 10 psi.

5. The method according to claim 1, wherein applying positive pressure to the FRP wrap comprises:
    attaching an air-tight bladder contained within a restraining structure to the FRP wrapped pile; and
    supplying a fluid to the air-tight bladder.

6. The method according to claim 5, wherein the restraining structure is rigid.

7. The method according to claim 5, wherein the restraining structure is flexible.

8. The method according to claim 1, wherein applying positive pressure to the FRP wrap and maintaining the positive pressure to the FRP wrap during curing of the resin comprises vacuum bagging.

9. The method according to claim 1, wherein applying positive pressure to the FRP wrap and maintaining the positive pressure to the FRP wrap during curing of the resin comprises pressure bagging.

10. The method according to claim 1, wherein applying positive pressure to the FRP wrap and maintaining the positive pressure to the FRP wrap during curing of the resin comprises a combination of vacuum bagging and pressure bagging.

* * * * *